United States Patent

[11] 3,547,190

| [72] | Inventor | Leonard Louis Wilkerson<br>Houston, Tex. |
|---|---|---|
| [21] | Appl. No. | 736,739 |
| [22] | Filed | June 13, 1968 |
| [45] | Patented | Dec. 15, 1970 |
| [73] | Assignee | Shell Oil Company<br>New York, N.Y.<br>a corporation of Delaware |

[54] APPARATUS FOR TREATING WASTE WATER ASSOCIATED WITH HYDROCARBON PRODUCTION
1 Claim, 1 Drawing Fig.

[52] U.S. Cl. .................................................. 166/75,
55/73, 55/171, 55/194, 166/267
[51] Int. Cl. ....................................................... B01d 19/00,
E21b 43/00
[50] Field of Search ............................................ 166/6, 8,
75, 265, 267; 55/73, 171(Inquired), 36, 52, 159,
194; 210/63 (Inquired); 239/16–23 (Inquired)

[56] References Cited
UNITED STATES PATENTS

| 2,217,143 | 10/1940 | Stevenson | (166/8UX) |
| 3,111,983 | 11/1963 | Frank | 166/8 |
| 3,276,186 | 10/1966 | Hronas et al. | 55/73X |
| 3,364,655 | 1/1968 | Solinhac | 55/73X |
| 1,291,579 | 1/1919 | MacFadden | 239/17X |
| 2,591,100 | 4/1952 | Rouse | 239/23 |

OTHER REFERENCES

Nordell, Eskel. Water Treatment. N.Y., Reinhold, 1961, pp. 114 and 310. TD430.N6. President's Science Adv. Comm., Report of the Environmental Pollution Panel. RESTORING THE QUALITY OF OUR ENVIRONMENT. G.P.O., Nov. 1965, pp. 214–217. TD420.U5. Uren, Lester C. Petroleum Production Eng'g: Oil Field Exploitation. N.Y., McGraw-Hill, 1953, pp. 556, 557 (Copy in Gp. 354).

Lewelling, Henry, et al. WHAT TO DO ABOUT SALT WATER. In Petroleum Engineer, July 1959, pp. B-19 thru B-24. TN860P4

*Primary Examiner*—Ian A. Calvert
*Attorneys*—J. H. McCarthy and Thomas R. Lampe

ABSTRACT: Method and apparatus for treating waste water associated with hydrocarbon production by steam or hot water secondary recovery methods wherein residual hydrogen sulfide gas concentrations in the water are substantially removed therefrom by spraying the water vertically into the air and the temperature of the water is lowered to a point whereby it will not upset the ecological balance of surrounding bodies of water.

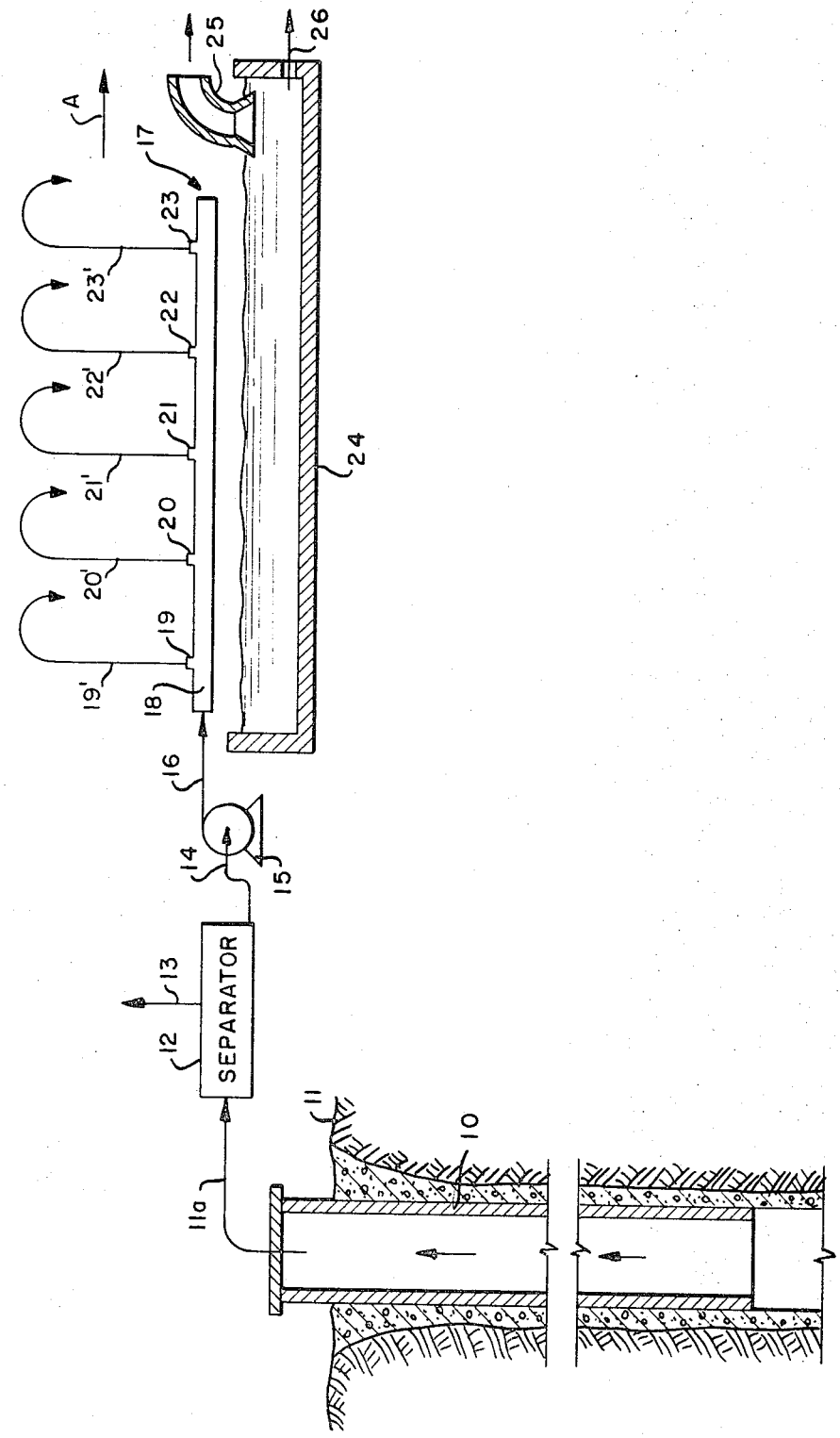

APPARATUS FOR TREATING WASTE WATER ASSOCIATED WITH HYDROCARBON PRODUCTION

This invention relates to the secondary recovery of hydrocarbon products from earth formations and pertains more particularly to a method and apparatus for removing hydrogen sulfide gas (H2S) from hydrocarbon fluid produced from an oil and/or gas well.

The percentage of oil that can be recovered from a reservoir by the energy originally available in that reservoir depends upon the characteristics of the reservoir fluids and upon the type of recovery mechanism. If the recovery by these natural forces (the primary recovery) is relatively low, as is often the case, it may be economic to improve the recovery of hydrocarbons through the use of what are known as secondary recovery techniques.

For the secondary recovery of particularly viscous or heavy crudes one preferred or commonly used technique has been the injection of pressurized steam or heated water through a well and into the reservoir. This serves to heat the oil, thus reducing its viscosity, and to force it out of the reservoir and into the same or another well from which it is subsequently recovered. Quite naturally, however, the fluid produced utilizing this technique contains a significant percentage of water, including that naturally found in the formation. The presence of this water is undesirable as it would occupy space in ships, pipelines and storage facilities which should economically be occupied by crude oil. Furthermore, in order to be accepted for transportation by most pipe line systems, crude oil should not contain more than 1 percent of water. Consequently most of the water produced with the oil is removed prior to shipment from the oil field. Some of this water separates freely from the crude while that which remains must be separated from the oil through one of several known separation techniques or treatments, such as by means of a flotation cell system, separating tanks, etc.

Disposal of the large quantities of water that are often produced is sometimes a problem. This is particularly true where concentrations of hydrogen sulfide gas are found in the waste water. Such concentrations may be formed by bacterial action or sulfite or sulfate ions found in the formation water and/or reactions with respect to sulfur compounds found in the formation caused by the heat of the steam. For example, sulfur may be naturally present in the oil itself or in materials, e.g. iron pyrites, found in the formation.

In addition to removing the residual H2S from the flotation cell or separator effluent, the temperature of the water is preferably reduced before disposal thereof so as not to upset the ecological balance of surrounding bodies of water, such as streams, rivers, etc., into which the water may ultimately be discharged. While commercial cooling tower units may be used for this purpose, the cost of such equipment may be uneconomical.

SUMMARY OF THE INVENTION

It is therefore a primary object of the present invention to provide an apparatus whereby residual waste water associated with hydrocarbon production is inexpensively treated in such a manner as to reduce concentrations of H2S contained therein to trace levels while at the same time reducing the temperature of the water.

This and other objects are attained in the present invention by providing a system wherein waste water from a well is pumped under pressure to a plurality of spray nozzles which are disposed in such a manner as to spray the water into the atmosphere in a substantially vertical direction. The sprayed water is thus aerated to remove the residual H2S therefrom and to reduce its temperature. The water is then collected in a basin wherein any excess oil still associated with the water may be skimmed from the surface of the water.

DESCRIPTION OF THE DRAWING

Other objects, purposes, and characteristic features of the present invention will be obvious from the following description of the invention taken with reference to the accompanying drawing wherein:

The FIG. shows in a schematic way how the apparatus and method according to the present invention operate to treat waste water associated with oil production.

Referring now to the FIG., an oil production well 10 is shown schematically within the earth 11 with production fluid including waste water flowing upwardly through line 11a out of the well and into a separating station 12. Separating apparatus at station 12 may be of any suitable commercial design and will not be described in detail since the equipment of the station forms no part of the present invention. Suffice it to say that the separating station 12 serves to substantially separate the hydrocarbon components of the production fluid from the waste water associated therewith in a well known manner. For example, a flotation cell system or any other desired type of separator system may be used for this purpose.

While most of the water separates freely from the crude, some of the water often occurs as microscopic droplets in a water-in-oil emulsion and it may be necessary to treat the production fluid in the separating station 12 by means of one or more of the known methods to ensure substantial separation of the water and hydrocarbon constituents. For example, the emulsion may be heated and chemicals added or it may be passed between electrodes maintained at a high alternating voltage potential—to mention just a few of the commonly used techniques.

In any event, the separated oil is removed from separating station 12 through drain line 13 and removed to a suitable storage facility (not shown) for subsequent treatment. The separated waste water is sucked from separating station 12 through a suction line 14 by means of a pump 15, which is preferably a constant pressure pump, or a pump provided with means for dampening pressure variations.

The pump 15 forces the waste water effluent from separating station 12 into a conduit 16 under a substantially constant pressure. From conduit 16 the pressurized water flows into a suitable spray manifold 17 which may comprise a hollow substantially tubular-shaped member or housing means 18 closed at the one end thereof remote from conduit 16 and having a plurality of spray nozzles 19—23 communicating with the interior thereof and directed in an upward direction. Spray manifold 17 is disposed over a collection basin 24 of any suitable design. Since the water is maintained under pressure, it emerges from tubular-shaped member 18, through spray nozzles 19—23, in the form of water sprays 19'—23' which spray into the surrounding atmosphere in the manner illustrated. After reaching a maximum predetermined spray height, the water falls downwardly into collection basin 24 and collects therein. Basin 24 may be in the form of a natural or manmade depression on the earth's surface.

The maximum height of the sprays 19°—23' will, of course, depend upon the pressure of the water and the dimensions of the nozzles 19—23. The spray height must be sufficient to aerate the water to such an extent that the undesirable quantities of H2S are removed from the water and dissipated to the surrounding atmosphere, and the water is cooled to a point whereby disposal thereof will not upset the ecological balance of surrounding bodies of water in which it will eventually be disposed. In FIG. 1, arrow A represents in schematic fashion the removal of the H2S from the sprayed water.

The spray nozzles may be of any suitable construction. It has been found that when five nozzles having 2-inch openings are employed in the instant arrangement, waste water will be sprayed approximately 75 feet into the air when pump pressure is maintained at about 350 pounds. This spray height has been found sufficient to reduce measured concentrations of H2S in the order of 95 p.p.m. to trace levels in the waste water processed through the spray system. In addition, waste water may be reduced from 100—125° F. to 75° F. so as not to disturb the ecological balance of surrounding bodies of water. Spray height may of course be varied as desired to compensate for changing conditions with respect to H2S concentrations, water treatments, air movement, etc. This may be done simply by varying the size of the nozzle openings and/or the pump pressure. In addition one or more of the plurality of spray nozzles (which may be of any desired total number) may be shut down if so desired.

The water collecting in basin 24 after the aeration thereof may contain traces of oil or other hydrocarbon residue not completely removed by separating station 12. It is desirable to remove this oil from the water before releasing it from basin 24 to flow into the surrounding area. Since the oil would tend to float on top of the water in the collection basin, removal of the oil may be accomplished readily by skimming it off the surface as by means of vacuum line 25 which may be connected to a vacuum storage truck (not shown). The oil thus collected may then be disposed of subsequently at any desired location. Waste water may then be drained from collection basin 24 through outlet or drain pipe 26 into the surrounding countryside.

It should thus be readily apparent that the above-described method and apparatus provide an inexpensive approach for the treatment of waste water associated with oil production. Residual H2S concentrations in the water may be drastically reduced and the water may be cooled without the necessity of constructing relatively expensive cooling tower systems, which may cost in the order of $45,000 or more, for this purpose. Although the system has been described with particular reference to a well wherein steam or hot water secondary recovery techniques have been employed, it should be understood that it has equal application to those situations wherein water actually produced with the oil from underground formations is to be treated.

While this invention has been described with reference to a preferred embodiment thereof, it should be understood that the particular form disclosed has been selected to facilitate explanation of the invention rather than to limit the number of forms which it may assume. Further, it should be understood that various modifications, alterations, and adaptations may be applied to the specific form described to meet the requirements of practice without in any manner departing from the spirit of the invention or the scope of the subjoined claims.

I claim:

1. Apparatus for treating waste water associated with hydrocarbon production to reduce the temperature of the water and substantially remove the water residual hydrogen sulfide gas concentrations, said apparatus comprising:
    pump means;
    conduit means defining a fluid flow path leading from said pump means;
    housing means operably associated with said conduit means and having an open end connected to said conduit means and a closed end, said housing means defining an interior in communication with the fluid flow path defined by said conduit means;
    a plurality of spaced upwardly extending nozzles disposed on at least a portion of said housing means between said open end and said closed end and in fluid communication with the interior defined by said housing means, said nozzles being in substantial alignment in an upward direction;
    said pump being adapted to force waste water under a substantially constant predetermined pressure into the interior of said housing means whereby said water is ejected from the interior of the housing means through said nozzles to spray in a substantially upward direction into the surrounding atmosphere for a predetermined distance sufficient to aerate the water so as to reduce hydrogen sulfide gas concentrations in said water and lower the temperature of said water;
    collection means comprising a collection basin having outlet means disposed at the bottom portion thereof whereby water collected in said basin may drain therefrom, said collection means being disposed under said housing means at least in the vicinity of said nozzles whereby water ejected from the interior of the housing means falls under the influence of gravity into said collection means after it has reached said predetermined distance; and
    vacuum line means disposed within said collection basin to skim the surface of the water in the basin to remove any hydrocarbon material floating on said water surface.